United States Patent [19]

Shibata et al.

[11] Patent Number: 5,354,585
[45] Date of Patent: Oct. 11, 1994

[54] MOLDING MATERIALS AND MOLDED PRODUCTS THEREFORM

[75] Inventors: Takashi Shibata, Kamakura; Koichi Akiyama, Osaka; Shinichiro Asao, Nishinomiya, all of Japan

[73] Assignee: Takeda Chemical Industries, Ltd., Osaka, Japan

[21] Appl. No.: 834,822

[22] Filed: Feb. 13, 1992

[30] Foreign Application Priority Data

Feb. 14, 1991 [JP] Japan .................. 3-021180

[51] Int. Cl.$^5$ .................. B32B 5/18; B32B 5/16
[52] U.S. Cl. .................. 428/35.9; 428/36.1; 428/36.4; 428/36.5; 428/283; 428/284; 428/286; 428/290; 428/313.5; 428/315.7; 428/315.9; 428/318.6; 428/325; 428/402; 428/406; 428/313.3
[58] Field of Search .................. 428/283, 323, 35.7, 428/36.1, 36.4, 36.5, 283, 284, 286, 290, 313.3, 315.7, 315.9, 318.6, 323, 325, 402, 406

[56] References Cited

U.S. PATENT DOCUMENTS 4,144,372  3/1979  Beck .................. 428/325

FOREIGN PATENT DOCUMENTS 1-114422  9/1989  Japan .
1-226311  9/1989  Japan .

*Primary Examiner*—Patrick J. Ryan
*Assistant Examiner*—Richard Weisberger
*Attorney, Agent, or Firm*—Wenderoth, Lind & Ponack

[57] ABSTRACT

A molding material is disclosed, comprising a film (A) coated on one surface with a thermosetting resin composition containing a hollow filler, a film (B) on which no resin composition is applied, and a reinforcing fiber layer positioned between the coated surface of film (A) and film (B), wherein the reinforcing fiber layer is impregnated with the liquid component of the resin composition coated on film (A). A piled material is also disclosed, comprising the two portions of the said molding material, wherein the respective molding materials are positioned on top of the other portion in a face-to-face relationship having their respective film (A) sides facing inwardly to each other, where the respective films (A) have been stripped off prior to positioning. A molded product prepared by curing the said piled material from which the films (B) have been stipped off prior to curing, under heating and compressing conditions are very useful for preparing a structural member which is lightweight and has high mechanical strength, due to its lower specific gravity and higher mechanical strength.

9 Claims, No Drawings

MOLDING MATERIALS AND MOLDED PRODUCTS THEREFROM

FIELD OF THE INVENTION

The present invention relates to a molding material comprising a reinforcing fiber impregnated with a lightweight resin composition useful for structural parts, and a molded product therefrom.

Fiber reinforced plastics (FRP) based on thermosetting resins such as unsaturated polyester resin or vinyl ester resin are not only excellent in mechanical strength, heat stability, water resistance and chemical resistance but also high in productivity, and therefore, have been used broadly in such applications as bath tubs, water tank panels, wash bowls and parts of vehicles including automobiles. While sheet molding compounds (hereinafter abbreviated as SMC) based on unsaturated polyester resin or vinyl ester resin have been widely used because of the high mechanical strength of the molded products therefrom as well as their easy handling and moldability, recent years have witnessed an additional demand for reduced weight of the molded product therefrom.

An approach to weight reduction is to cut down on the proportion of filler or glass fiber in the molded product, but this practice generally causes a marked decrease in mechanical properties (e.g. strength, modulus, etc.) thereof.

On the other hand, it is also a known practice to lower the specific gravity of molded products by using a lightweight filler of hollow structure represented by silas balloon or glass microballoon (hereinafter referred to briefly as GMB). Since, however, the incorporation of such hollow filler generally causes a remarkable decrease in mechanical strength, the use of said filler in molding compounds for structural parts has not been practical.

The intensive exploration of a molding compound giving the molding product excellent mechanical properties and reduced weight led the present inventors to the following findings. (1) Since the hollow filler useful for a lightweight molding compound is low in strength, it tends to fracture when it is subjected to high shear forces. (2) Mechanical properties of molded products obtained from a lightweight molding compound containing a hollow filler are remarkably lower due to the presence of the hollow filler near the surface of molded products.

To avoid such drawbacks as described above, a method of obtaining a molded product having a high-strength skin layer free from the hollow filler and a lightweight core layer containing said filler, i.e. a molded product of so-called sandwich construction (three-layer construction) has been proposed (Japanese Kokai Tokkyo Koho No.1-225533). This method, however, generally requires the preparation of two or more kinds of molding compounds, which lowers productivity.

Besides, a method of obtaining a molding material by integrating a layer comprising a resin and a hollow filler with a layer comprising a resin and a reinforcing fiber was proposed (Japanese Kokai Tokkyo Koho No.1-226311). This method, however, has such drawbacks as being low in productivity due to requiring two kinds of resin compositions for respective layers and being poor in mechanical strength due to the somewhat high content of resin and the insufficient content of reinforcing fiber in the latter layer, this being brought on by allowing a resin to be applied in the above-mentioned two layers.

Based on the above findings, the present inventors diligently conducted further studies. The inventors found that a molded product containing no substantial hollow filler and a sufficient content of reinforcing fiber near the surface of it and a sufficient content of hollow filler in its interior has excellent mechanical strength. The molded product can be obtained by first preparing a molding material comprising a film (A) coated on one surface with a thermosetting resin composition containing a hollow filler, a film (B) on which no resin composition is applied, and a reinforcing fiber layer positioned between the coated surface of film (A) and film (B), wherein the reinforcing fiber layer is impregnated with the liquid components of the resin composition. Then the two separate portions of the molding materials from which the respective films (A) have been stripped off prior to positioning, are positioned on each other in a face-to-face relationship so that the film (A) side of each the respective molding materials faces inwardly to each other. The thus-piled molding materials can be cured under heating and compressing conditions after stripping off their respective films (B). The above finding was followed by further research which has culminated in the present invention.

DETAILED DESCRIPTION OF THE INVENTION

Thus the present invention relates to a molding material comprising a film (A) coated on one surface with a thermosetting resin composition containing a hollow filler, a film (B) on which no resin composition is applied, and a reinforcing fiber layer positioned between the coated surface of film (A) and film (B), wherein the reinforcing fiber layer is impregnated with the liquid components of the resin composition. The present invention also relates to a piled material comprising the two portions of the said molding materials, wherein the respective portions are positioned on the top of the other portion in a face-to-face relationship having their respective film (A) sides facing inwardly to each other, where the films (A) have been stripped off prior to positioning, and to a molded product by curing the piled material under heating and compressing conditions, from which the films (B) have been stripped off prior to curing.

The hollow filler to be employed in the present invention can be any of those with a number average particle diameter of not more than $100\mu$, preferably 20 to $65\mu$, more preferably 35 to $50\mu$. Especially preferable are those of independent cell structure, which are exemplified by GMB, silas balloon or ceramics microballoon. Among them, GMB is preferably used. The true specific gravity of the hollow filler usually ranges from about 0.2 to about 1.2, and preferably from about 0.3 to about 0.8.

The amount of such hollow filler ranges from 10 to 200 parts by weight, and especially preferable 10 to 100 parts by weight relative to 100 parts by weight of the mixture of resin component and vinyl monomer described later. In order to insure an improved compatibility of the hollow filler with the resin composition and to suppress the release of alkaline substance from the hollow filler, the filler may be previously surface-treated with, for example, silane coupling agent, and polymeric resin such as acrylic resin, polyvinyl acetate resin, urethane resin, polyester resin, etc.

As the resin component to be employed in the present invention constituting the thermosetting resin composition with a hollow filler, mention is made of, for example, thermosetting resins such as unsaturated polyester resin, vinylester resin and epoxy resin. These are used singly or as a mixture of two or more of them. Among them, unsaturated polyester resin or vinylester resin is preferably employed. These resin components are in the form of a solution in the vinyl monomer to be described below. The vinyl monomer content in the resin component range from 20 to 60 weight %, preferably from about 30 to about 50 weight %.

The polyester of the unsaturated polyester resin to be employed in the present invention is synthesized from an $\alpha$, $\beta$-olefinic unsaturated dicarboxylic acid and a glycol by condensation reaction and, as such, has been generally used. In the synthesis of such polyester, saturated dicarboxylic acids, aromatic dicarboxylic acids or dicyclopentadiene reactive with dicarboxylic acid can also be used in addition to said two starting materials. Examples of the $\alpha$, $\beta$-olefinic unsaturated dicarboxylic acid include maleic acid, fumaric acid, itaconic acid, citraconic acid and the corresponding anhydrides. Examples of said dicarboxylic acid which may be used together with such an $\alpha$, $\beta$-olefinic unsaturated dicarboxylic acid include, adipic acid, sebacic acid, succinic acid, gluconic acid, phthalic anhydride, o-phthalic acid, isophthalic acid, terephthalic acid, tetrahydrophthalic acid, tetrachlorophthalic acid and so. The glycol includes alkanediols, oxaalkanediols, and other diols such as the adduct of ethylene oxide, propylene oxide or the like to bisphenol A. Monools may also be additionally used. Examples of the alkanediols include ethylene glycol, 1,2-propylene glycol, 1,3-butanediol, 1,4-butanediol, neopentyl glycol, 1,5-pentanediol, 1,6-hexanediol, cyclohexane diol, etc. The oxaalkanediols are exemplified by dioxyethylene glycol, trioxyethylene glycol, etc. These glycols can be used, when required, together with a mono- or trivalent glycol, as exemplified by octyl alcohol, oleyl alcohol, trimethylolpropane, etc. The synthesis of such polyester is generally conducted under heating, with condensed water being constantly removed from the reaction system. In the present invention, the use of an unsaturated polyester with a number average molecular weight of 800 to 4,000 and a styrene solution of an unsaturated polyester (polyester/styrene=60/40 weight ratio) having an acid value of 0 to 50 mg KOH/gr, a hydroxyl value of 10 to 50 mg KOH/gr and a viscosity of 500 to 3000 cps at 25° C. is especially preferable.

The vinyl ester of the vinyl ester resin to be employed in the present invention is synthesized by 10 subjecting an unsaturated carboxylic acid such as acrylic acid and methacrylic acid to an addition reaction to epoxy resin, and, as such, is well known. Examples of the epoxy resin to be used for the synthesis of said vinyl ester include difunctional bisphenol A type, bisphenol F type and polyfunctional novolac type ones. Examples of the unsaturated carboxylic acid to be reacted include acrylic acid, methacrylic acid, crotonic acid, cinnamic acid, maleic acid, fumaric acid, itaconic acid, citraconic acid, etc. And, when necessary, a mono-valent saturated carboxylic acid such as acetic acid, butyric acid, octylic acid, benzoic acid, etc. and a divalent saturated carboxylic acid such as isophthalic acid, terephthalic acid, tetrahydrophthalic acid, tetrachlorophthalic acid, etc. can also be used in addition to the said unsaturated carboxylic acid. The synthesis of the vinyl ester is conducted, in general, under heating at temperatures ranging from 70° C. to 150° C. in the presence of a catalyst such as amines, organic acid salts, quaternary ammonium salts, halogenides, alkali or alkaline-earth metal hydroxides, etc. And, when necessary, a polymerization inhibitor such as quinones or polyhydric phenols can also be used. In the present invention, the use of a vinyl ester with a number average molecular weight of 400 to 4000 and a styrene solution of the vinyl ester (vinyl ester/styrene=60/40 weight ratio) having a hydroxyl value of 100 to 200 mg KOH/gr and a viscosity of 500 to 3000 cps at 25° C. is especially preferable.

As the epoxy resin to be employed in the present invention, mention is made of bis-type ones such as bisphenol A type and bisphenol F type or novolac type ones. The epoxy resin may be used in combination with at least one of the hardeners as exemplified by polyamines, acid anhydrides, polyhydric phenols and dicyandiamide. Furthermore, other amines, imidazole compounds or organometallic salts can be used together as a promoter.

The resin composition of the present invention contains a vinyl monomer and a polymerization initiator besides the afore-mentioned hollow filler and resin component.

The vinyl monomers to be employed in the present invention include those which are conventionally used as diluents or cross-linking agents for the above-mentioned resin component, as exemplified by aromatic vinyl monomers such as styrene, p-chlorostyrene, vinyltoluene, divinylbenzene, diallylphthalate, etc. and acrylic vinyl monomers such as acrylic acid, methyl ester of acrylic acid, methacrylic acid, methyl ester of methacrylic acid, acrylonitrile, trimethylol propane dimethacrylate, trimethylol propane trimethacrylate, etc. The amount of the vinyl monomer to be employed including that for preparing the above-mentioned resin components, is 10 to 80 parts by weight, preferably 20 to 60 parts by weight, relative to 100 parts by weight of the resin composition including hollow fillers.

The polymerization initiator to be employed in accordance with the present invention includes peroxy esters such as t-butyl peroxybenzoate and t-butyl peroxyoctoate, peroxy ketals such as 1,1-bis(t-butyl peroxy)-3,3,5-trimethylcyclohexane, peroxycarbonates such as t-butyl peroxyisopropylcarbonate etc. At least one of these initiators is employed in a proportion of 0.5 to 5 parts by weight, preferably 1 to 3 parts by weight, relative to 100 parts by weight of the resin composition including hollow fillers. A polymerization promotor such as organometal salt of cobalt as described in Japanese Kokai Tokkyo Koho No.1-315458 may be used in combination with the above-mentioned polymerization initiator.

The resin composition of the present invention may contain, besides the above-mentioned materials, for example, thermoplastic resins, fillers, polymerization inhibitors, pigments, thickeners, etc.

The thermoplastic resin to be employed in the present invention can be any of those thermoplastic resins which are conventionally used as low profile agents for unsaturated polyester resins, as exemplified by polybutadiene or its hydrogenation product, polyisoprene or its hydrogenation product, aromatic vinyl/conjugated diene block copolymer or its hydrogenation product, polystyrene, styrene/vinylacetate block copolymer, poly (vinyl acetate), poly (methyl methacrylate), etc. In addition, saturated polyesters (molecular weight: 3,000 to 100,000), polyether, etc. can also be mentioned.

Examples of the filler include calcium carbonate, talc, clay, glass powder, etc.

Examples of the polymerization inhibitor include parabenzoquinone, t-butyl catechol, etc.

Examples of the pigment include titanium oxide, carbon black, red iron oxide, phthalocyanine blue, etc.

Examples of the thickener include oxides or hydroxides of an alkaline earth metal such as magnesium, calcium etc. and polyfunctional isocyanates such as tolylene diisocyanate, diphenylmethane diisocyanate etc., or the like.

The molding material of the present invention can be prepared by a conventional apparatus to provide SMC using the resin composition containing a hollow filler. More specifically stated, paste of the resin composition containing a hollow filler is coated on one surface of either one of an upper or lower film (e.g. polyethylene etc.) with a doctor blade etc., and a reinforcing fiber is placed between the coated surface of one film and the other film which is not coated with the resin composition, like a sandwich, and the whole material is compressed so as to impregnate the reinforcing fiber with the liquid components of the resin composition. Then this compressed material is rolled up and aged for an appropriate period of time at temperatures ranging from room temperature to about 40° C. to provide a molding material which is handled easily.

Examples of the reinforcing fiber employed in the present invention include inorganic fiber such as glass fiber, carbon fiber, etc., or organic fiber such as aramide fiber or high strength polyethylene fiber, etc. As the said reinforcing fiber, the use is made of chopped strand, continuous strand mat, cloth, nonwoven fabric, etc. The reinforcing fiber is incorporated usually at about 10 to 80 weight %, preferably about 30 to 70 weight % based on the resultant molding material. When the content is less than 10 weight %, sufficient mechanical strength is not attained, while, when the content exceeds 80 weight %, impregnation of the liquid component into the reinforcing fiber is sometimes insufficient. In the present invention, the liquid component means components other than the hollow filler in the resin composition, such as the resin component, a vinyl monomer, polymerization initiator, thermoplastic resin, polymerization inhibitor, thickener, etc. The weight of a unit area of the thus obtained molding material ranges from 0.5 to 7.0 kg/m$^2$, preferably about 1.0 to about 4.5 kg/m$^2$. When it is less than 0.5 kg/m$^2$, filtration cannot be performed satisfactorily, while when it exceeds 7.0 kg/m$^2$, impregnation of the liquid component into the reinforcing fiber is sometimes insufficient.

A lightweight molded product excellent in mechanical strength, which contains a sufficient content of hollow filler in its interior and contains substantially no hollow filler and a sufficient content of reinforcing fiber near its surface, can be prepared by positioning one portion of two portions of molding materials of the present invention on top of the other portion in a face-to-face relationship having their respective film (A) sides facing inwardly each other, where their respective films (A) have been stripped off prior to positioning, stripping off their respective films (B) at any time before curing and curing the thus-piled materials under heating (50° to 180° C.) and compressing (10 to 200 kgf/cm$^2$) conditions by the use of a conventional compression molding machine.

The film to be employed in the present invention is thermoplastic film such as polyethylene film, poly(vinylchloride) film, poly(vinylacetate)film, etc.

Thus, by coating a resin composition containing a hollow filler on only one of the films, the hollow filler is exclusively filtered by the reinforcing fiber and remains on the film (A) side, and the liquid components other than the hollow filler of the resin composition are exclusively impregnated onto the film (B) side. In the present invention, coating on the surface of only one of the films is sufficient, which serves to heighten the productivity. Since the molding material thus obtained contains a large amount of hollow filler on its film (A) side but contains substantially no hollow filler on its film (B) side, and since, in the molding material of the present invention, the liquid components of the resin composition are impregnated from the film (A) side to the film (B) side on which no resin composition is coated, the content of liquid components becomes lower and the content of reinforcing fiber becomes higher nearer to the surface of film (B). Thus the structure of the molding material of the present invention gives excellent mechanical strength to the molded product therefrom, and the molding product is lightweight and has a remarkably high mechanical strength. Therefore, the molding material of the present invention is especially useful for preparing a structural member which is lightweight and high in mechanical strength, such as for vehicle parts, including automobiles.

PREFERRED EMBODIMENTS OF THE INVENTION

The following Examples will describe the present invention in a more practical manner.

EXAMPLES 1 TO 12 AND COMPARATIVE EXAMPLES 1 TO 12

Molding materials were prepared in accordance with the formulation shown in Table 1. Referring to the Table 1, Unsaturated Polyester Resin A is a styrene solution of the unsaturated polyester containing 35 weight % of styrene having a viscosity of 1,350 cps at 25° C. and an acid value of 17.3 mg KOH/gr. Said unsaturated polyester was synthesized from 1.0 mol. of propylene glycol, 0.7 mol. of maleic anhydride and 0.3 mol. of isophthalic acid. Unsaturated Polyester Resin B is a styrene solution of unsaturated polyester containing 35 weight % of styrene, having a viscosity of 2,300 cps at 25° C. an acid value of 4.5 mg KOH/gr and a hydroxyl value of 35.0 mg KOH/gr. Said unsaturated polyester was synthesized from 1.1 mol. of propylene glycol, 0.7 mol. of maleic acid and 0.3 mol. of isophthalic acid. Vinyl Ester Resin A is a styrene solution of vinyl ester containing 45 weight % of styrene, having a viscosity of 200 cps at 25° C. and a hydroxyl value of 122 mg KOH/gr. Said vinyl ester was synthesized from 1 mol. of a commercially available bisphenol A type epoxy resin and 2 mol. of methacrylic acid. The glass microballoon A has a number average particle diameter of 45 $\mu$m, whose true specific gravity is 0.35, and the glass microballoon B has a number average particle diameter of 40 $\mu$m, whose true specific gravity is 0.4. The MDI prepolymer is a prepolymer of diphenylmethane diisocyanate and its amine equivalent is 180. In Examples 1 to 12, the paste of a resin composition was charged on a conventional SMC-impregnating machine, a given amount of the paste was coated on one surface of an upper polyethylene film (A) via the doctor blade, and a chopped strand of one-inch length glass fiber was allowed to drop on the lower polyethylene film (B) on which no resin composition was coated. The film (A) was then placed so as to allow the coated surface thereof to face downward to the film (B) thereby preparing a sandwich-like structure. The structure was then subjected to compression. The chopped strand was impregnated with the liquid components other than the hollow filler in the above-mentioned paste. The whole material was then wound up in roll form, followed by aging at 40° C. for 3 days to afford a molding material like a SMC. Two section of the molding material prepared as indicated above were removed from the wound roll and the film (A) was stripped from each section. The two sections were then placed together with their film (A) sides in face-to-face relationship. The film (B) was stripped from each of the sections and the piled material was subjected to curing for 80 seconds at 140°–150° C. under 60 Kgf/cm$^2$ to give a molded product of a size of 300×300 mm and a thickness of 3 mm. In Comparative Examples 1 to 12, a molding material and a molded product were obtained by the same procedure as in Examples 1 to 12, except that two sheets of polyethylene film were respectively coated with the same amount of a resin composition. Measurements of flexural strength and flexural modulus were conducted according to JIS K-7055. It is apparent from Tables 1 and 2 that the molded product of the present invention has excellent mechanical strength as compared with the molded products in the Comparative Examples.

TABLE 1

| | | Composition of Molding Material Properties of Molded Product | | | | | | | | | | | |
|---|---|---|---|---|---|---|---|---|---|---|---|---|---|
| | | Ex. No. 1 | Ex. No. 2 | Ex. No. 3 | Ex. No. 4 | Ex. No. 5 | Ex. No. 6 | Ex. No. 7 | Ex. No. 8 | Ex. No. 9 | Ex. No. 10 | Ex. No. 11 | Ex. No. 12 |
| (1) | Composition | | | | | | | | | | | | |
| | a) Unsaturated Polyester Resin A | 75 | 75 | 75 | 75 | — | — | 75 | 75 | — | — | — | — |
| | Unsaturated Polyester Resin B | — | — | — | — | 63 | — | — | — | 63 | — | 63 | — |
| | b) Vinyl Ester Resin A | — | — | — | — | — | 63 | — | — | — | 63 | — | 63 |
| | c) Styrene | 25 | 25 | 25 | 25 | 25 | 25 | 25 | 25 | 25 | 25 | 25 | 25 |
| | d) t-Butylperoxybenzoate | 1 | 1 | 1 | 1 | 1 | 1 | 1 | 1 | 1 | 1 | 1 | 1 |
| | e) Glass Microballoon A | 35 | — | 28 | 20 | 35 | 35 | 28 | 20 | 28 | 20 | 38 | 38 |
| | Glass Microballoon B | — | 35 | — | — | — | — | — | — | — | — | — | — |
| | f) Calcium Carbonate | — | — | 32 | 50 | — | — | — | — | — | — | — | — |
| | g) Clay | — | — | — | — | — | — | 32 | 50 | 32 | 50 | 8 | 8 |
| | h) Magnesium Oxide | 1 | 1 | 1 | 1 | — | — | 1 | 1 | — | — | — | — |
| | i) MDI Prepolymer | — | — | — | — | 12 | 12 | — | — | 12 | 12 | 12 | 12 |
| | j) Glass Fiber (Dia. 13u, Length, 1") | 135 | 110 | 160 | 170 | 135 | 135 | 160 | 170 | 160 | 170 | 146 | 146 |
| (2) | Impregnation Process | one face | one face | one face | one face | one face | one face | one face | one face | one face | one face | one face | one face |
| (3) | Properties of Molded Product | | | | | | | | | | | | |
| | a) Specific Gravity | 1.127 | 1.128 | 1.323 | 1.478 | 1.125 | 1.129 | 1.325 | 1.481 | 1.321 | 1.479 | 1.124 | 1.121 |
| | b) Flexural Strength (kgf/mm$^2$) | 21.9 | 22.5 | 25.0 | 28.2 | 24.3 | 26.2 | 24.7 | 28.0 | 24.5 | 26.5 | 27.5 | 28.5 |
| | c) Flexural modulus (kgf/mm$^2$) | 1433 | 1525 | 1698 | 1750 | 1482 | 1551 | 1670 | 1730 | 1470 | 1580 | 1610 | 1730 |

TABLE 2

| | | Composition of Molding Material and Properties of Molded Product (Comparative Examples) | | | | | | | | | | | |
|---|---|---|---|---|---|---|---|---|---|---|---|---|---|
| | | C. Ex. No. 1 | C. Ex. No. 2 | C. Ex. No. 3 | C. Ex. No. 4 | C. Ex. No. 5 | C. Ex. No. 6 | C. Ex. No. 7 | C. Ex. No. 8 | C. Ex. No. 9 | C. Ex. No. 10 | C. Ex. No. 11 | C. Ex. No. 12 |
| (1) | Composition | | | | | | | | | | | | |
| | a) Unsaturated Polyester Resin A | 75 | 75 | 75 | 75 | — | — | 75 | 75 | — | — | — | — |
| | Unsaturated Polyester Resin B | — | — | — | — | 63 | — | — | — | 63 | — | 63 | — |
| | b) Vinyl Ester Resin A | — | — | — | — | — | 63 | — | — | — | 63 | — | 63 |
| | c) Styrene | 25 | 25 | 25 | 25 | 25 | 25 | 25 | 25 | 25 | 25 | 25 | 25 |
| | d) t-Butylperoxybenzoate | 1 | 1 | 1 | 1 | 1 | 1 | 1 | 1 | 1 | 1 | 1 | 1 |
| | e) Glass Microballoon A | 35 | — | 28 | 20 | 35 | 35 | 28 | 20 | 28 | 20 | 38 | 38 |
| | Glass Microballoon B | — | 35 | — | — | — | — | — | — | — | — | — | — |
| | f) Calcium Carbonate | — | — | 32 | 50 | — | — | — | — | — | — | — | — |
| | g) Clay | — | — | — | — | — | — | 32 | 50 | 32 | 50 | 8 | 8 |
| | h) Magnesium Oxide | 1 | 1 | 1 | 1 | — | — | 1 | 1 | — | — | — | — |
| | i) MDI Prepolymer | — | — | — | — | 12 | 12 | — | — | 12 | 12 | 12 | 12 |
| | j) Glass Fiber (Dia. 13u, Length, 1") | 135 | 110 | 160 | 170 | 135 | 135 | 160 | 170 | 160 | 170 | 146 | 146 |
| (2) | Impregnation Process | both faces | both faces | both faces | both faces | both faces | both faces | both faces | both faces | both faces | both faces | both faces | both faces |
| (3) | Properties of Molded Product | | | | | | | | | | | | |
| | a) Specific Gravity | 1.125 | 1.126 | 1.317 | 1.491 | 1.123 | 1.127 | 1.320 | 1.485 | 1.325 | 1.483 | 1.125 | 1.121 |
| | b) Flexural Strength (kgf/mm$^2$) | 17.8 | 18.2 | 20.3 | 22.3 | 19.5 | 20.1 | 20.9 | 22.5 | 21.9 | 24.0 | 19.0 | 20.1 |
| | c) Flexural modulus | 872 | 920 | 1025 | 1125 | 932 | 953 | 1035 | 1151 | 1170 | 1380 | 940 | 982 |

What is claimed is:

1. A molding material which is prepared by
   (1) coating one surface of a film (A) with a thermosetting resin composition containing a hollow filler having a number average particle diameter of 20 to 65μ, a vinyl monomer and a polymerization initiator, the amount of the hollow filler ranging from 10 to 200 parts by weight relative to 100 parts by weight of the mixture of resin component and vinyl monomer in the resin composition,
   (2) placing a reinforcing fiber on the coated film obtained in step (1), the amount of the reinforcing fiber being 10 to 80 weight % of the said molding material,
   (3) covering the reinforcing fiber with a film (B), and
   (4) compressing the resulting structure to impregnate the resulting fiber with the liquid components of the resin composition.

2. The molding material claimed in claim 1, wherein the hollow filler has a number average particle diameter of 35 to 50μ.

3. The molding material claimed in claim 1, wherein the true specific gravity of the hollow filler ranges from about 0.2 to about 1.2.

4. The molding material claimed in claim 1, wherein the true specific gravity of the hollow filler ranges from about 0.3 to about 0.8.

5. The molding material claimed in claim 1, wherein the hollow filler is glass microballoon.

6. The molding material claimed in claim 1, wherein the hollow filler is surface-treated with at least one number selected from the group consisting of a silane coupling agent and a polymeric resin.

7. The molding material claimed in claim 1, wherein the resin component of the thermosetting resin composition is unsaturated polyester resin or vinylester resin.

8. The molding material claimed in claim 1, wherein the content of the reinforcing fiber is 30 to 70 weight % of the molding material.

9. The molding material claimed in claim 1, wherein the amount of the hollow filler ranges from 10 to 100 parts by weight relative to 100 parts by weight of the mixture of resin component and vinyl monomer in the resin composition.

* * * * *